Nov. 8, 1932.  C. LORBER  1,887,161
TRACING CHART
Filed Aug. 12, 1931
*Fig.1.*
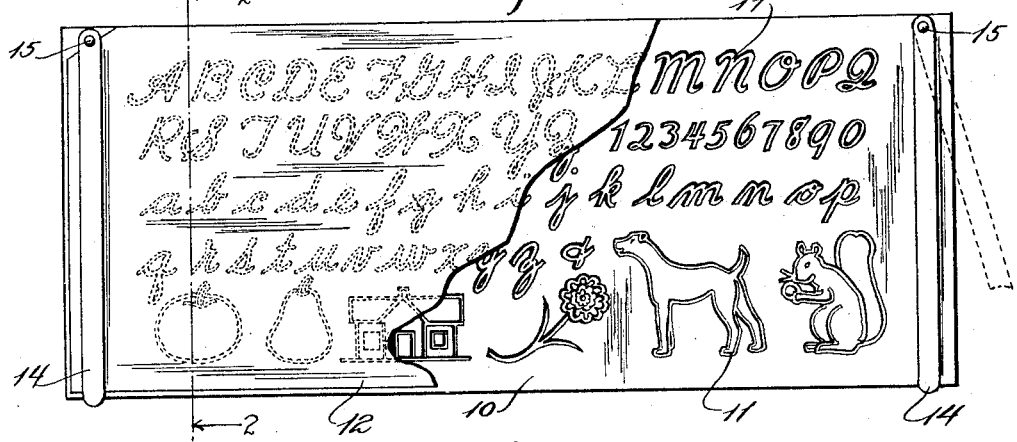
*Fig.2.*
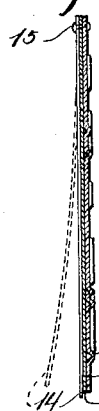
*Fig.3.*  *Fig.4.*
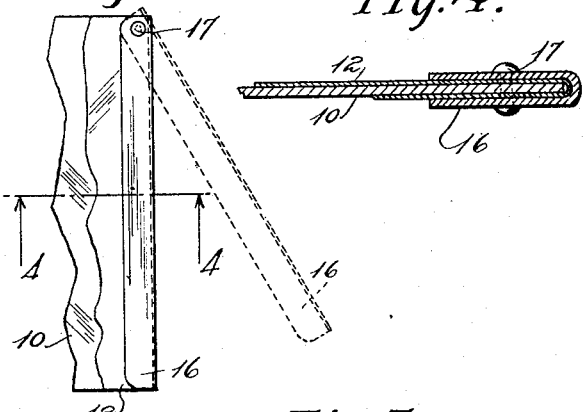
*Fig.5.*
*Fig.6.*
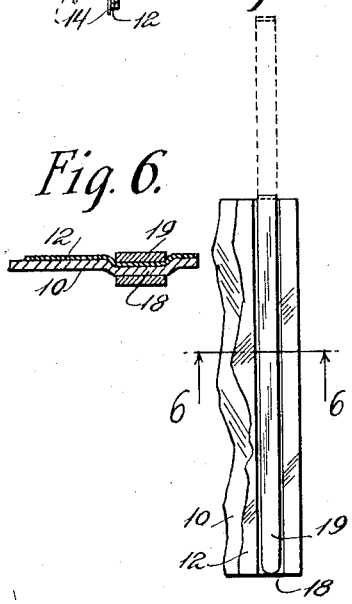
*Fig.7.*
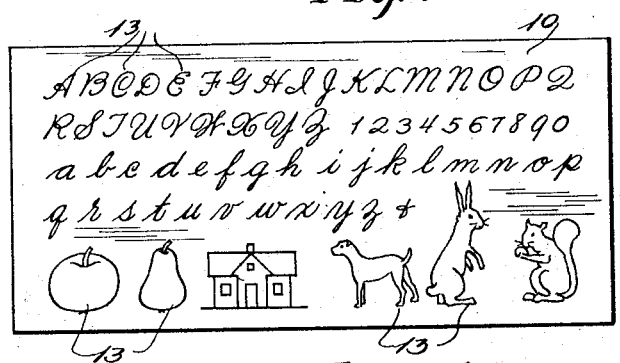
Inventor
Charles Lorber
By E. J. Clarkson
Attorney Patented Nov. 8, 1932

1,887,161

UNITED STATES PATENT OFFICE

CHARLES LORBER, OF LOUISVILLE, KENTUCKY

TRACING CHART

Application filed August 12, 1931. Serial No. 556,689.

This invention relates to educational devices and has special reference to a tracing chart.

Heretofore there have been several methods of using these charts all of which are defective owing to the lack of provision for proper use of such a chart. Such tracing charts consist of a sheet whereon is printed or incised letters, figures and other characters such as the outlines of natural and artificial objects. By tracing over these the student acquires a knowledge of the formation of such letters, figures and other characters. In one case the tracing is done directly on the card which quickly becomes useless. In another case such charts are bound in a book with tracing tissue bound in front of each chart and the tracing is done on the tissue. By reason of the fact that after the bound tissue sheets have been used the student cannot bind in other sheets such a book also quickly reaches the limit of its usefulness.

A third method is to provide the student with a chart and a number of loose sheets of tracing tissue which are held in position by one hand while the other is used in the tracing operation. Because of the difficulty of holding the tissue in its original position this practice leads to distortion of the traced figures and is thus defective. Nevertheless, the provision of a tracing chart and loose tracing tissue sheets enables the relatively expensive chart to be used for a long time without deterioration. The defect of this method lies in the lack of provision of means whereby the tissue sheets may be removably secured to the chart.

It is the principal object of the invention to provide an improved tracing chart having means for securing a sheet of tracing tissue removably thereon.

With the above and other objects in view as will be hereinafter apparent, the invention consists in general of certain novel details of construction and combinations of parts hereinafter fully described, illustrated in the accompanying drawing and specifically claimed.

In the accompanying drawing like characters of reference indicate like parts in the several views, and Figure 1 is a face view of one preferred form of the invention showing the tracing tissue sheet partly torn off to more fully disclose the chart beneath.

Figure 2 is a section on the line 2—2 of Figure 1.

Figure 3 is a detail face view of one end of a second form of the invention showing a modified form of tracing tissue clip.

Figure 4 is an enlarged section on the line 4—4 of Figure 3.

Figure 5 is a view similar to Figure 4 but showing a second modification of the clip.

Figure 6 is an enlarged section on the line 6—6 of Figure 5.

Figure 7 is a face view of a modification of the chart itself, this modification being capable of being used with any of the clip arrangements shown.

In the construction of this invention there is provided a tracing chart 10 of cardboard, thin metal or other thin and somewhat stiff material. On this chart are arranged the representations to be traced and, as in Figures 1 to 6, such representations 11 may be stamped or incised in the material to present intaglio lines or grooves. These grooves are shallow and broad enough to admit them being followed through a tissue or tracing sheet 12 by the point of a pencil without tearing the sheet. In Figure 7 the grooved representations are replaced by ordinary printing as at 13, this form being that to be used by older scholars while the intaglio form is to be used by beginners.

In the form of the invention shown in Figures 1 and 2 spring clips 14 are secured to the chart by pivots 15 adjacent each upper corner, these clips being capable of being swung out from the body of the chart as shown in dotted lines in Figure 1 or sprung up therefrom as in Figure 2 for the insertion of the tissue tracing sheet 12. These clips when in normal position over the sheet 12 hold the latter securely to the chart and yet the sheet may be readily removed for the placement of a fresh sheet.

In Figures 3 and 4 the clips 14 are replaced by channel shaped clips 16 pivoted, as before, at 17. In using this form the tracing sheet is lapped over the ends of the chart and is thus removably held by the clips which also act as a binding for the end edges of the chart.

In Figures 5 and 6 the chart 10 is provided with struck down portions 18 forming grooves on one side of the chart and elongated U-shaped clips 19 are slid on and off the chart at these grooves to hold the tracing sheet in place.

It will be seen that in each case the chart itself is provided with means for releasably holding a tracing sheet thereon.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a device of the kind described, a relatively thick rectangular base member having guide grooves in its upper surface presenting a series of alphabetic and other characters, a relatively thin and transparent tracing sheet resting on said base member, and a pair of clips respectively pivoted to a respective corner of the base member and extending along opposite edge portions of the tracing sheet to hold the same on the base member.

2. In a device of the kind described, a base member having intaglio guide grooves formed in its upper surface and presenting a series of characters to be traced, and a thin and transparent sheet of tracing paper resting on said base member and covering said grooves, said grooves being of sufficient width to permit the paper to be forced therein by the action of a tracing implement in following the grooves.

3. In a device of the kind described, a base member having intaglio guide grooves formed in its upper surface and presenting a series of characters to be traced, a thin and transparent sheet of tracing paper resting on said base member and covering said grooves, said grooves being of sufficient width to permit the paper to be forced therein by the action of a tracing implement in following the grooves, and means permanently attached to the base member to overlie opposite edge portions of the paper to hold the same flat on the base member and to prevent wrinkling of the paper during the tracing operation.

In testimony whereof I affix my signature.

CHARLES LORBER.